UNITED STATES PATENT OFFICE.

EDUARD HENN, OF JERSEY CITY, NEW JERSEY.

FUEL COMPOSITION.

SPECIFICATION forming part of Letters Patent No. 378,249, dated February 21, 1888.

Application filed April 6, 1887. Serial No. 233,863. (No specimens.)

*To all whom it may concern:*

Be it known that I, EDUARD HENN, of Jersey City, in the county of Hudson and State of New Jersey, have invented certain new and useful Improvements in Fuel Compositions, of which the following is a specification.

This invention relates to an improved fuel composition, which is compressed into lumps or cakes and used as a substitute for coal or other heating agents for domestic or other purposes, the composition having the quality of burning slowly, without flame or smoke, and emitting an intense heat.

The invention consists of a fuel composition which is composed of pulverized charcoal, anthracite or coke, sugar or acetate of lead, starch, and alum.

The method of compounding the ingredients is as follows: Ninety-four pounds of pulverized charcoal or coke are mixed with three pounds of sugar or acetate of lead, three pounds of starch, which is made in a thin paste by additional water, and one-quarter of a pound of sulphate of alum. These ingredients are mixed with water in a sufficient quantity to produce a plastic composition, the starch imparting the proper degree of adhesion to the mass when the same has been compressed into molds, while the sugar of lead supplies the necessary oxygen for making it burn with little draft. The alum serves to some extent for retarding the too quick burning of the composition, the same being added in a somewhat larger quantity when used with anthracite coal or coke, while a smaller quantity is required when charcoal is used. The mass, after being thoroughly mixed, is run into molds and compressed into lumps or cakes of the desired size. The lumps or cakes are then dried by a gentle heat until the water is entirely evaporated therefrom.

The lumps or cakes burn with a very slight draft, and without smoke or flame, and emit a very great volume of heat. The fuel can be ignited by means of a match and then continues to burn on slowly, so that it is adapted to be used in sad-irons, heating and cooking stoves, car-heaters, and for other purposes.

Having thus described my invention, I claim as new and desire to secure by Letters Patent—

The herein-described fuel composition, consisting of pulverized charcoal, anthracite or coke, starch, sugar of lead, and alum, substantially as set forth.

In testimony that I claim the foregoing as my invention I have signed my name in presence of two subscribing witnesses.

EDUARD HENN.

Witnesses:
PAUL GOEPEL,
MARTIN PETRY.